J. W. CREMIN.
Gas Burner.

No. 94,476.  Patented Sept. 7, 1869.

WITNESSES:  INVENTOR:

United States Patent Office.

JOSEPH W. CREMIN, OF NEW YORK, N. Y.

Letters Patent No. 94,476, dated September 7, 1869.

IMPROVEMENT IN GAS-BURNERS.

The Schedule referred to in these Letters Patent and making part of the same.

*To all whom it may concern:*

Be it known that I, JOSEPH W. CREMIN, of the city, county, and State of New York, have invented a new and improved Gas-Burner for street-lamps and other lamps; and I do hereby declare that the following is a full and exact description thereof, reference being had to the accompanying drawings, and the letters and figures of reference marked thereon.

The nature of my invention consists in a gas-burner for street-lamps and other lamps, having an annular open space through the centre, and a space between the walls, with slots on the outer side, through which the gas issues.

In the drawing—

Figure 2:
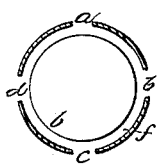
Figure 2 is a horizontal section through the slots *a b c*, shown in fig. 1.
Figure 1:
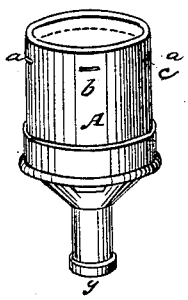
Figure 1 is a perspective view of my improved burner.

A is the burner.

*a b c d* indicate the slots through which the gas issues.

*e* is the inside wall, and *f* the space into which the gas enters through the stem *g*.

The upper part of the burner between the walls is closed, the gas issuing only through the slots *a b c d*.

This burner can be used with or without surrounding glass, but cannot be used with a chimney.

It will be evident to those skilled in this art that it is almost an impossibility for the wind to extinguish the gas in this burner.

The advantages of my burner over those of the same general form having apertures on the top are these:

First, my burner, without a chimney, consumes all the gas without smoking, which the others cannot do.

Second, my burner can be used in street-lamps, the others cannot, and they cannot be used at all without a chimney.

Third, my burner (the lights being eccentrically situated) leaves no shadows of lamp-posts or lamp-corners on the streets, as all other burners do.

Fourth, the manner of making the slots and the upward pressure of the heated air produce long crescent flames original in appearance.

Fifth, my burner produces more light with less gas than the burners now used in street-lamps.

I am aware of the English patent granted to Burleigh, in 1848, for gas-burner, No. 12,053, and disclaim all invention shown in that device.

My burner has horizontal slots near the top, and is the only burner adapted for street-lamps which can produce the above results.

Circular holes will not produce the results which my horizontal slots will, as two jets issuing from different circular apertures will not blend as readily, nor form so united and steady a flame, nor produce as much light with as little gas, as a horizontal slot will.

I believe I have thus shown the nature of my invention so as to enable others to make and use the same; therefore,

What I claim, and desire to secure by Letters Patent of the United States, is—

As a new article of manufacture, the burner A, provided with horizontal slots *a b c d*, as and for the purpose described.

JOSEPH W. CREMIN.

Witnesses:
WILLIAM B. WALLACE,
PATRICK W. CREMIN,